(12) United States Patent
Zhou et al.

(10) Patent No.: US 9,988,487 B2
(45) Date of Patent: Jun. 5, 2018

(54) BLOCKED 1,8-DIAZABICYCLO[5.4.0]UNDEC-7-ENE BICARBONATE CATALYST FOR AEROSPACE SEALANTS

(71) Applicant: PRC-DeSoto International, Inc., Sylmar, CA (US)

(72) Inventors: Hongying Zhou, Allison Park, PA (US); Juexiao Cai, Stevenson Ranch, CA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 222 days.

(21) Appl. No.: 14/964,785

(22) Filed: Dec. 10, 2015

(65) Prior Publication Data

US 2017/0166689 A1 Jun. 15, 2017

(51) Int. Cl.
| | | |
|---|---|---|
| *C08G 59/68* | (2006.01) | |
| *C09J 5/06* | (2006.01) | |
| *C09J 163/00* | (2006.01) | |
| *C09J 163/04* | (2006.01) | |

(52) U.S. Cl.
CPC .............. *C08G 59/686* (2013.01); *C09J 5/06* (2013.01); *C09J 163/00* (2013.01); *C09J 163/04* (2013.01); *C09J 2463/00* (2013.01)

(58) Field of Classification Search
CPC ...... C08G 16/00; C08G 59/686; C08G 75/02; C08K 5/00; C08L 81/00; C08L 81/02; C09J 163/00; C09J 163/04; C09J 5/06; C09J 2463/00
USPC ......................................................... 528/90
See application file for complete search history.

(56) References Cited

U.S. PATENT DOCUMENTS

| | | |
|---|---|---|
| 4,366,307 A | 12/1982 | Singh et al. |
| 4,609,762 A | 9/1986 | Morris et al. |
| 5,225,472 A | 7/1993 | Cameron et al. |
| 5,270,364 A | 12/1993 | Schwartz et al. |
| 5,284,888 A | 2/1994 | Morgan |
| 6,172,179 B1 | 1/2001 | Zook et al. |
| 6,525,168 B2 | 2/2003 | Zook et al. |
| 7,671,145 B2 | 3/2010 | Sawant et al. |
| 8,513,339 B1 | 8/2013 | Keledjian et al. |
| 8,541,513 B2 | 9/2013 | Hobbs et al. |
| 8,710,159 B2 | 4/2014 | Blackford et al. |
| 9,006,360 B2 | 4/2015 | Keledjian et al. |
| 2006/0270796 A1 | 11/2006 | Sawant et al. |
| 2007/0287810 A1 | 12/2007 | Rao et al. |
| 2009/0326167 A1 | 12/2009 | Sawant et al. |
| 2010/0010133 A1 | 1/2010 | Zook et al. |
| 2010/0041839 A1 | 2/2010 | Anderson et al. |
| 2012/0238707 A1 | 9/2012 | Hobbs et al. |
| 2014/0110881 A1* | 4/2014 | Keledjian ............... B32B 15/08 264/241 |
| 2017/0114259 A1* | 4/2017 | Virnelson ............. C09K 3/1012 |

OTHER PUBLICATIONS

Heldebrandt et al. ("The Reaction of 1,8-Diazabicyclo[5.4.0]undec-7-ene (DBU) with Carbon Dioxide", J. Org. Chem. 2005, 70, 5335-5338).*
Heldebrandt et al., "The Reaction of 1,8-Diazabicyclo[5.4.0]undec-7-ene (DBU) with Carbonate Dioxide," Journal Organic Chemistry, 2005, vol. 70, No. 13, p. 5335-5338.

* cited by examiner

*Primary Examiner* — Ling Choi
*Assistant Examiner* — Chun-Cheng Wang
(74) *Attorney, Agent, or Firm* — William R. Lambert

(57) ABSTRACT

Compositions comprising sulfur-containing prepolymers such as polythioether prepolymers, polyepoxides, and a blocked 1,8-diazabicyclo[5.4.0]undec-7-ene bicarbonate catalyst useful as aerospace sealants are disclosed. The compositions exhibit extended working time and the curing rate can be tailored for specific applications.

20 Claims, 1 Drawing Sheet

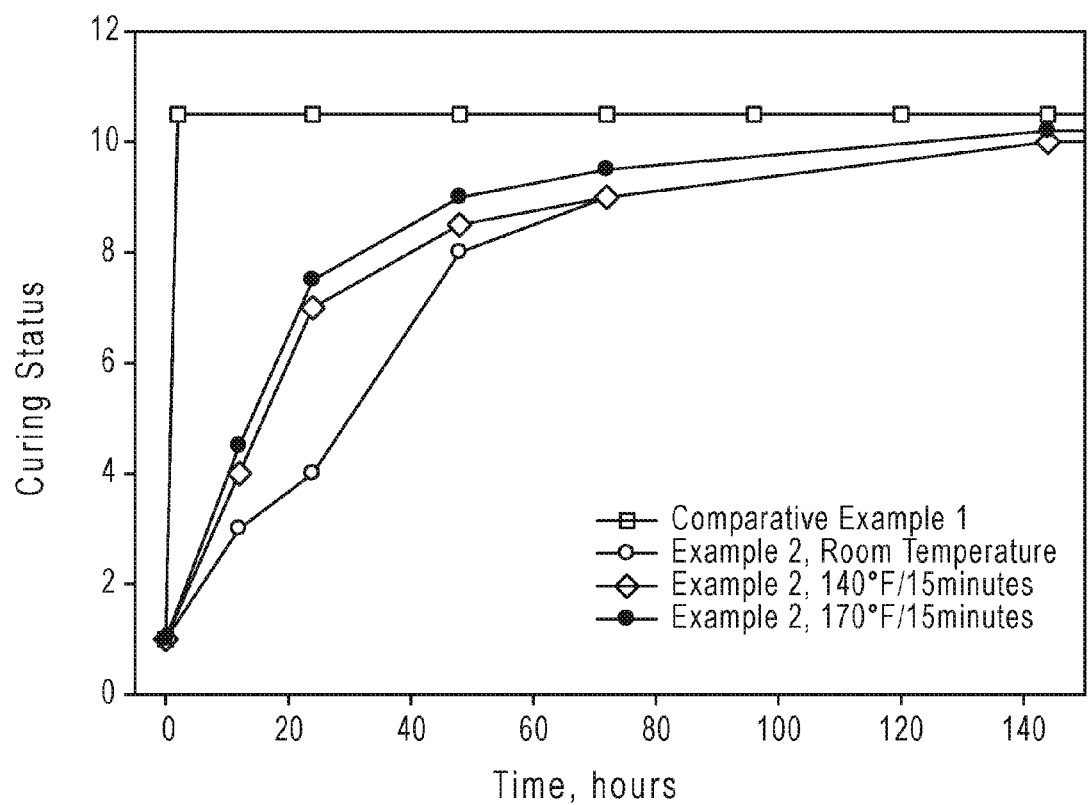

US 9,988,487 B2

BLOCKED 1,8-DIAZABICYCLO[5.4.0]UNDEC-7-ENE BICARBONATE CATALYST FOR AEROSPACE SEALANTS

FIELD

The present disclosure relates to compositions comprising sulfur-containing prepolymers such as thiol-terminated polythioether prepolymers, polyepoxides, and a blocked 1,8-diazabicyclo[5.4.0]undec-7-ene bicarbonate catalyst. The compositions are useful in aerospace sealant applications where they exhibit extended working time and provide controlled curing rates.

BACKGROUND

Aerospace sealants must satisfy demanding mechanical, chemical, and environmental requirements. The sealants can be applied to a variety of surfaces including metal surfaces, primer coatings, intermediate coatings, finished coatings, and aged coatings. Sealants comprising sulfur-containing prepolymers that exhibit acceptable fuel resistance, thermal resistance, and flexibility for aerospace applications are described, for example, in U.S. Pat. No. 6,172,179. In sealants such as those described in U.S. Application Publication Nos. 2006/0270796, 2007/0287810, and 2009/0326167, a sulfur-containing polymer such as a thiol-terminated polythioether prepolymer can be reacted with a polyepoxide curing agent in the presence of an amine catalyst to provide a cured product. These systems are useful as sealants and can meet the demanding performance requirements of the aerospace industry. Without a strong base catalyst, such as an amine catalyst, the reaction between the thiol and epoxy groups is slow and provides a relatively long working time, for example, of several days to weeks, depending on the temperature. However, the physical properties of these slowly cured sealants are generally not acceptable. In contrast, in the presence of a strong base catalyst the reaction is fast, and although exhibiting acceptable cured properties, provides a working time of only about 2 hours to about 12 hours depending upon the particular system. For many applications, however, a longer working time such as from 12 hours to 48 hours is desirable.

In practice, sealants can be provided as two-part compositions in which a thiol-terminated sulfur-containing prepolymer and a polyepoxide are provided as separate components, with the amine catalyst in the thiol-containing component, and the two parts can be mixed shortly prior to use. Alternatively, the base catalyst may be provided as a third component, and the component containing the thiol-terminated sulfur-containing prepolymer, the component containing the polyepoxide, and the component containing the base catalyst can be mixed shortly before use. However, once the components are mixed, the thiol and epoxy groups react, and depending at least in part on the temperature and on the type of amine catalyst, the working time can be limited to less than from 2 hours to 12 hours. Furthermore, once the reactants are combined and as the composition cures, there is little ability to control the reaction rate to take advantage of the complex chemistries taking place after the sealant is applied to a surface.

As disclosed in U.S. Pat. No. 9,006,360, compositions comprising thiol-terminated sulfur-containing prepolymers, polyepoxides, and an encapsulated amine catalyst provide an extended working time. However, the components forming the encapsulant, which become incorporated into the cured polymer network, can compromise properties such as the fuel resistance of the cured polymer.

Ways to extend the working time and to control the curing rate of compositions comprising thiol-terminated sulfur-containing prepolymers and polyepoxides and that provide a cured sealant that meets the performance requirements of aerospace applications are desired.

SUMMARY

Therefore, it is desirable to provide aerospace compositions, such as sealants, that exhibit an extended working time at ambient temperature and, following application to a surface, cure to form a cured sealant having acceptable properties for aerospace sealant applications. Compositions provided by the present disclosure exhibit a working time greater than 20 hours at room temperature and cure within 24 hours to 72 hours after the working time.

Compositions provided by the present disclosure include a blocked amine catalyst such as a blocked 1,8-diazabicyclo[5.4.0]undec-7-ene (DBU) bicarbonate catalyst. The blocked DBU bicarbonate catalyst comprises the stable bicarbonate salt of DBU. The blocked amine catalyst can be activated upon exposure to elevated temperature.

According to the present invention a composition can comprise (a) a thiol-terminated sulfur-containing prepolymer; (b) a polyepoxide curing agent; and (c) a blocked 1,8-diazabicyclo[5.4.0]undec-7-ene bicarbonate catalyst.

According to the present invention a cured sealant can be prepared from a composition provided by the present disclosure.

According to the present invention a part can comprise a cured sealant provided by the present disclosure on at least a portion of the part.

According to the present invention a method of sealing a part can comprise applying a composition provided by the present disclosure to at least a portion of a part; and curing the applied composition to provide a sealed part.

BRIEF DESCRIPTION OF THE DRAWINGS

FIG. 1 is a graph showing curing profiles for sealant compositions comprising an unblocked amine catalyst or a blocked DBU bicarbonate catalyst provided by the present disclosure.

Reference is now made to certain compositions and methods according to the present invention. The disclosed compositions and methods are not intended to be limiting of the claims. To the contrary, the claims are intended to cover all alternatives, modifications, and equivalents.

DETAILED DESCRIPTION

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

A dash ("-") that is not between two letters or symbols is used to indicate a point of bonding for a substituent or between two atoms. For example, —CONH$_2$ is bonded to another chemical moiety through the carbon atom.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. An alkanediyl can be, for example, $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—CH$_2$—), ethane-1,2-diyl (—CH$_2$CH$_2$—), propane-1,3-diyl and iso-propane-1,2-diyl (e.g., —CH$_2$CH$_2$CH$_2$— and —CH(CH$_3$)CH$_2$—), butane-1,4-diyl (—CH$_2$CH$_2$CH$_2$CH$_2$—), pentane-1,5-diyl (—CH$_2$CH$_2$CH$_2$CH$_2$CH$_2$—), hexane-1,6-diyl (—CH$_2$CH$_2$CH$_2$CH$_2$CH$_2$CH$_2$—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl, or cyclohexanediyl. Each alkyl and/or alkanediyl group(s) can be $C_{1-6}$, $C_{1-4}$, $C_{1-3}$, methyl, methanediyl, ethyl, or ethane-1,2-diyl. An alkanecycloalkane group can be $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be, for example, $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined herein. Each aryl and/or arenediyl group(s) can be, for example, $C_{6-12}$, $C_{6-10}$, phenyl or benzenediyl. Each alkyl and/or alkanediyl group(s) can be, for example, $C_{1-6}$, $C_{1-4}$, $C_{1-3}$, methyl, methanediyl, ethyl, or ethane-1,2-diyl. An alkanearene group can be, for example, $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, or $C_{6-9}$ alkanearene. Examples of alkanearene groups include diphenyl methane.

"Alkanearenediyl" refers to a diradical of an alkanearene group. An alkanearenediyl group can be, for example, $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, or $C_{6-9}$ alkanearenediyl. Examples of alkanearenediyl groups include diphenyl methane-4,4'-diyl.

"Alkenyl" group refers to a group $(R)_2C=C(R)_2$. An alkenyl group has the structure —C(—R)=C(R)$_2$ where the alkenyl group is a terminal group and is bonded to a larger molecule. Each R may be selected from, for example, hydrogen and $C_{1-3}$ alkyl. Each R can be hydrogen and an alkenyl group has the structure —CH=CH$_2$.

"Alkoxy" refers to a —OR group where R is alkyl as defined herein. Examples of alkoxy groups include methoxy, ethoxy, n-propoxy, isopropoxy, and n-butoxy. An alkoxy group can be, for example, $C_{1-8}$ alkoxy, $C_{1-6}$ alkoxy, $C_{1-4}$ alkoxy, or $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be, for example, $C_{2-6}$ alkyl, $C_{2-4}$ alkyl, or $C_{2-3}$ alkyl. Examples of alkyl groups include methyl, ethyl, n-propyl, iso-propyl, n-butyl, iso-butyl, tert-butyl, n-hexyl, n-decyl, tetradecyl, and the like. An alkyl group can be $C_{2-6}$ alkyl, $C_{2-4}$ alkyl, or $C_{2-3}$ alkyl. It will be appreciated that a branched alkyl has at least three carbon atoms.

"Arenediyl" refers to diradical monocyclic or polycyclic aromatic group. Examples of arenediyl groups include benzene-diyl and naphthalene-diyl. An arenediyl group can be, for example, $C_{6-12}$ arenediyl, $C_{6-10}$ arenediyl, $C_{6-9}$ arenediyl, or benzene-diyl.

A "curable composition" refers to a composition that comprises at least two reactants capable of reacting to form a cured composition. For example, a curable composition can comprise a thiol-terminated polythioether prepolymer and a polyepoxide capable of reacting to form a cured polymer network. A curable composition may include a catalyst for the curing reaction and other components such as, for example, fillers, pigments, and adhesion promoters. A curable composition may be curable at ambient conditions such as room temperature and humidity, or may require exposure to elevated temperature, moisture, or other condition to initiate and/or accelerate the curing reaction. A curable composition may initially be provided as a two part composition including a base component and an accelerator component. The base composition can contain one of the reactants participating in the curing reaction such as a thiol-terminated polythioether prepolymer and the accelerator composition can contain the other reactant such as a polyepoxide. The two compositions can be mixed shortly before use to provide a curable composition. A curable composition can exhibit a viscosity suitable for a particular method of application. For example, a Grade A sealant composition, which is suitable for brush-on applications can be characterized by a viscosity from 150 Poise to 500 Poise.

A Grade B sealant composition, which is suitable for fillet seal applications can be characterized by a viscosity from 8,000 Poise to 16,000 Poise. A C sealant composition, which is suitable for fay seal applications can be characterized by a viscosity from 1,000 Poise to 4,000 Poise. After the two compositions are combined and mixed, the curing reaction can proceed and the viscosity of the curable composition can increase and at some point will no longer be workable. The period of time between when the two compositions are mixed to form the curable composition and when the curable composition can no longer be reasonably applied to a surface for its intended purpose is referred to as the working time. As can be appreciated, the working time can depend on a number of factors including, for example, the curing chemistry, the application method, and the temperature. The working time can also be referred to as the pot life. Once a curable composition is applied to a surface (and during application), the curing reaction process to provide a cured composition. A cured composition develops a tack-free surfaces and fully cures over a period of time. A curable composition can be considered to be cured when the surface is tack-free, or can be considered cured when the Shore A hardness of the surface is 35 A.

"Cycloalkanediyl" refers to a diradical saturated monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl, and cyclohexane-1,2-diyl.

"Cycloalkyl" refers to a saturated monocyclic or polycyclic hydrocarbon monoradical group. A cycloalkyl group can be, for example, $C_{3-12}$ cycloalkyl, $C_{3-8}$ cycloalkyl, $C_{3-6}$ cycloalkyl, or $C_{5-6}$ cycloalkyl.

"Heteroalkanediyl" refers to an alkanediyl group in which one or more of the carbon atoms are replaced with a heteroatom, such as N, O, S, or P. In a heteroalkanediyl, a heteroatom can be selected from N and O.

"Heterocycloalkanediyl" refers to a cycloalkanediyl group in which one or more of the carbon atoms are replaced with a heteroatom, such as N, O, S, or P. In a heterocycloalkanediyl, the heteroatom can be selected from N and O.

"Heteroarenediyl" refers to an arenediyl group in which one or more of the carbon atoms are replaced with a heteroatom, such as N, O, S, or P. In a heteroarenediyl, the heteroatom can be selected from N and O.

"Heterocycloalkanediyl" refers to a cycloalkanediyl group in which one or more of the carbon atoms are replaced with a heteroatom, such as N, O, S, or P. In a heterocycloalkanediyl, the heteroatom can be selected from N and O.

As used herein, "polymer" refers to oligomers, homopolymers, and copolymers. Unless stated otherwise, molecular weights are number average molecular weights for polymeric materials indicated as "Mn" as determined, for example, by gel permeation chromatography using a polystyrene standard in an art-recognized manner.

"Substituted" refers to a group in which one or more hydrogen atoms are each independently replaced with the same or different substituent(s). A substituent can be selected from halogen, $-S(O)_2OH$, $-S(O)_2$, $-SH$, $-SR$, $C_{1-6}$ alkyl, $-COOH$, $-NO_2$, $-NR_2$ where each R is independently selected from hydrogen and $C_{1-3}$ alkyl, $-CN$, $=O$, $C_{1-6}$ alkyl, $-CF_3$, $-OH$, phenyl, $C_{2-6}$ heteroalkyl, $C_{5-6}$ heteroaryl, $C_{1-6}$ alkoxy, and $-COR$ where R is $C_{1-6}$ alkyl. A substituent can be chosen from, for example, $-OH$, $-NH_2$, and $C_{1-3}$ alkyl.

Compositions provided by the present disclosure can comprise at thiol-terminated sulfur-containing prepolymer, a polyepoxide curing agent, and a blocked DBU bicarbonate catalyst such as the DBU bicarbonate salt.

A thiol-terminated sulfur-containing prepolymer can comprise a thiol-terminated polythioether prepolymer, a thiol-terminated polysulfide prepolymer, or a combination thereof. For example, a thiol-terminated sulfur-containing prepolymer can comprise a thiol-terminated polythioether prepolymer. The thiol-terminated sulfur-containing prepolymer may comprise a mixture of different polythioethers and/or polysulfides, and the polythioethers and/or polysulfides may have the same or different functionality. A thiol-terminated sulfur-containing prepolymer can have an average functionality from 2 to 6, from 2 to 4, from 2 to 3, or from 2.05 to 2.8. For example, a thiol-terminated sulfur-containing prepolymer can comprise a difunctional thiol-terminated sulfur-containing polymer, a trifunctional thiol-terminated sulfur-containing polymer, or a combination thereof.

Examples of suitable thiol-terminated polythioether prepolymers for use in compositions provided by the present disclosure are disclosed, for example, in U.S. Pat. No. 6,172,179. For example, a thiol-terminated polythioether prepolymer can comprise a Permapol® P3.1E, available from PRC-DeSoto International Inc., Sylmar, Calif.

A thiol-terminated sulfur-containing prepolymer can comprise a backbone comprising the structure of Formula (1):

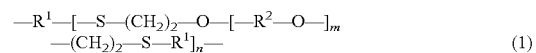
$$-R^1-[-S-(CH_2)_2-O-[-R^2-O-]_m \\ -(CH_2)_2-S-R^1]_n- \quad (1)$$

wherein:
(i) each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a $-[(-CHR^3-)_p-X-]_q-(CHR^3-)_r-$ group, wherein each $R^3$ is selected from hydrogen and methyl;
(ii) each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a $-[(-CH_2-)_p-X-]_q-(CH_2)_r-$ group;
(iii) each X is independently selected from O, S, $-NH-$ and $-N(-CH_3)-$;
(iv) m ranges from 0 to 50;
(v) n is an integer ranging from 1 to 60;
(vi) p is an integer ranging from 2 to 6;
(vii) q is an integer ranging from 1 to 5; and
(viii) r is an integer ranging from 2 to 10.

A thiol-terminated sulfur-containing prepolymer can comprise a thiol-terminated polythioether prepolymer of Formula (2), a thiol-terminated polythioether prepolymer of Formula (2a), or a combination thereof:

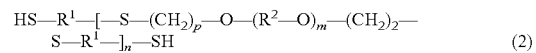
$$HS-R^1-[-S-(CH_2)_p-O-(R^2-O)_m-(CH_2)_2- \\ S-R^1-]_n-SH \quad (2)$$

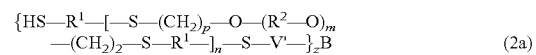
$$\{HS-R^1-[-S-(CH_2)_p-O-(R^2-O)_m \\ -(CH_2)_2-S-R^1-]_n-S-V'-\}_zB \quad (2a)$$

wherein:
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(-CHR^3-)_p-X-]_q-(-CHR^3-)_r-$, wherein:
p is an integer from 2 to 6;
q is an integer from 1 to 5;
r is an integer from 2 to 10;

each $R^3$ is independently selected from hydrogen and methyl; and each X is independently selected from —O—, —S—, —NH— and —N(—CH$_3$)—;

each $R^2$ is independently selected from $C_{1-10}$ alkanediyl, $C_{6-8}$ cycloalkanediyl, $C_{6-14}$ alkanecycloalkanediyl, and —[(—CHR$^3$—)$_p$—X—]$_q$—(—CHR$^3$—)$_r$—, wherein p, q, r, $R^3$, and X are as defined as for $R^1$;

m is an integer from 0 to 50;
n is an integer from 1 to 60;
p is an integer from 2 to 6;
B represents a core of a z-valent, vinyl-terminated polyfunctionalizing agent B(—V)$_z$ wherein:
z is an integer from 3 to 6; and
each V is a group comprising a terminal vinyl group; and
each —V'— is derived from the reaction of —V with a thiol.

In prepolymers of Formula (2) and Formula (2a), $R^1$ can be —[(—CH$_2$—)$_p$—X—]$_q$—(CH$_2$)$_r$—, where p is 2, X is —O—, q is 2, r is 2, $R^2$ is ethanediyl, m is 2, and n is 9.

In prepolymers of Formula (2) and Formula (4a), $R^1$ can be selected from $C_{2-6}$ alkanediyl and —[(—CHR$^3$—)$_p$—X—]$_q$—(CHR$^3$)$_r$—.

In prepolymers of Formula (2) and Formula (2a), $R^1$ can be —[(CHR$^3$)$_p$—X—]$_q$—(CHR$^3$)$_r$—, X can be —O— or X can be —S—.

In prepolymers of Formula (2) and Formula (2a), $R^1$ can be —[(CHR$^3$)$_p$—X—]$_q$—(CHR$^3$)$_r$—, p is 2, r is 2, q is 1, and X is —S—; p is 2, q is 2, r is 2, and X is —O—; or p is 2, r is 2, q is 1, and X is —O—.

In prepolymers of Formula (2) and Formula (2a), $R^1$ can be —[(CHR$^3$)$_p$—X—]$_q$—(CHR$^3$)$_r$—, each $R^3$ can be hydrogen or at least one $R^3$ can be methyl.

In prepolymers of Formula (2) and Formula (2a), each $R^1$ can be the same, or at least one $R^1$ can be different.

Various methods can be used to prepare the thiol-terminated polythioether prepolymers. Examples of suitable thiol-terminated polythioether prepolymers, and methods for their production, are described, for example, in U.S. Pat. No. 6,172,179. The thiol-terminated polythioether prepolymers may be difunctional, such as linear prepolymers having two thiol terminal groups, or polyfunctional, such as branched prepolymers having three or more terminal thiol groups. Thiol-terminated polythioether prepolymers may also comprise a combination of difunctional and polyfunctional thiol-terminated polythioether prepolymers. Suitable thiol-terminated polythioether prepolymers are commercially available, for example, as Permapol® P3.1E, from PRC-DeSoto International Inc., Sylmar, Calif.

Suitable thiol-terminated polythioether prepolymers may be produced by reacting a divinyl ether or mixtures of divinyl ethers with an excess of dithiol or a mixtures of dithiols. For example, dithiols suitable for use in preparing thiol-terminated polythioether prepolymers include those having the structure of Formula (3), other dithiols disclosed herein, or combinations of any of the dithiols disclosed herein.

A dithiol useful in preparing a thiol-terminated polythioether provided by the present disclosure can have the structure of Formula (3):

$$HS-R^1-SH \qquad (3)$$

wherein:
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[(CHR$^3$)$_p$—X—]$_q$—(CHR$^3$)$_r$—;

wherein:
each $R^3$ is independently selected from hydrogen and methyl;
each X is independently selected from —O—, —S—, —NH— and —N(—CH$_3$)— wherein R is selected from hydrogen and methyl;
p is an integer from 2 to 6;
q is an integer from 1 to 5; and
r is an integer from 2 to 10.

In dithiols of Formula (3), $R^1$ can be —[—(CHR$^3$)$_p$—X—]$_q$—(CHR$^3$)$_r$—.

In dithiols of Formula (3), X can be —O— or —S—, and thus —[—(CHR$^3$)$_p$—X—]$_q$—(CHR$^3$)$_r$— in Formula (3) can be —[(—CHR$^3$—)$_p$—O—]$_q$—(CHR$^3$)$_r$— or —[(—CHR$^3$—)$_p$—S—]$_q$—(CHR$^3$)$_r$—. In moieties having the structure —[—(CHR$^3$)$_p$—X—]$_q$—(CHR$^3$)$_r$—, p and r can be the same, such as both p and r can be two.

In dithiols of Formula (3), $R^1$ can be $C_{2-6}$ alkanediyl or —[—(CHR$^3$)$_p$—X—]$_q$—(CHR$^3$)$_r$—.

In dithiols of Formula (3), $R^1$ can be —[—(CHR$^3$)$_p$—X—]$_q$—(CHR$^3$)$_r$—, and X can be —O— or X can be —S—.

In dithiols of Formula (3), $R^1$ can be —[—(CHR$^3$)$_p$—X—]$_q$—(CHR$^3$)$_r$—, p can be 2, r can be 2, q can be 1, and X can be —S—; or p can be 2, q can be 2, r can be 2, and X can be —O—; or p can be 2, r can be 2, q can be 1, and X can be —O—.

In dithiols of Formula (3), $R^1$ can be —[—(CHR$^3$)$_p$—X—]$_q$—(CHR$^3$)$_r$—, each $R^3$ can be hydrogen or at least one $R^3$ is methyl.

Examples of suitable dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendant groups selected from a lower (e.g., $C_{1-6}$) alkyl group, a lower alkoxy group, and a hydroxyl group. Suitable alkyl pendant groups include, for example, $C_{1-6}$ linear alkyl, $C_{3-6}$ branched alkyl, cyclopentyl, and cyclohexyl.

Other examples of suitable dithiols include dimercaptodiethylsulfide (DMDS) (in Formula (3), $R^1$ is —[(—CH$_2$—)$_p$—X—]$_q$—(CH$_2$)$_r$—, wherein p is 2, r is 2, q is 1, and X is —S—); dimercaptodioxaoctane (DMDO) (in Formula (3), $R^1$ is —[(—CH$_2$—)$_p$—X—]$_q$—(CH$_2$)$_r$—, wherein p is 2, q is 2, r is 2, and X is —O—); and 1,5-dimercapto-3-oxapentane (in Formula (3), $R^1$ is —[(—CH$_2$—)$_p$—X—]$_q$—(CH$_2$)$_r$—, wherein p is 2, r is 2, q is 1, and X is —O—). It is also possible to use dithiols that include both heteroatoms in the carbon backbone and pendant alkyl groups, such as methyl groups. Such compounds include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CHCH$_3$CH$_2$—SH and HS—CH(CH$_3$)CH$_2$—S—CH$_2$CH(CH$_3$)—SH.

Suitable divinyl ethers for use in preparing polythioether prepolymers include, for example, divinyl ethers of Formula (4):

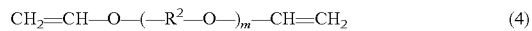

$$CH_2=CH-O-(-R^2-O-)_m-CH=CH_2 \qquad (4)$$

where $R^2$ in Formula (4) can be $C_{2-6}$ n-alkanediyl, $C_{3-6}$ branched alkanediyl, $C_{6-8}$ cycloalkanediyl, $C_{6-10}$ alkanecycloalkanediyl, or —[(—CH$_2$—)$_p$—O—]$_q$—(—CH$_2$—)$_r$—, where p is an integer ranging from 2 to 6, q is an integer from 1 to 5, and r is an integer from 2 to 10. In a divinyl ether of Formula (4), R$^2$ can be C$_{2-6}$ n-alkanediyl, C$_{3-6}$ branched alkanediyl, C$_{6-8}$ cycloalkanediyl, C$_{6-10}$ alkanecycloalkanediyl, or —[(—CH$_2$—)$_p$—O—]$_q$—(—CH$_2$—)$_r$—.

Suitable divinyl ethers include, for example, divinyl ethers having at least one oxyalkanediyl group, such as from 1 to 4 oxyalkanediyl groups, i.e., compounds in which m in Formula (4) is an integer ranging from 1 to 4. In divinyl ethers of Formula (4), m can be an integer ranging from 2 to 4. It is also possible to employ commercially available divinyl ether mixtures that are characterized by a non-integral average value for the number of oxyalkanediyl units per molecule. Thus, m in Formula (4) can also take on rational number values ranging from 0 to 10.0, such as from 1.0 to 10.0, from 1.0 to 4.0, or from 2.0 to 4.0.

Examples of suitable divinyl ethers include divinyl ether, ethylene glycol divinyl ether (EG-DVE) (R$^2$ in Formula (4) is ethanediyl and m is 1), butanediol divinyl ether (BD-DVE) (R$^2$ in Formula (4) is butanediyl and m is 1), hexanediol divinyl ether (HD-DVE) (R$^2$ in Formula (4) is hexanediyl and m is 1), diethylene glycol divinyl ether (DEG-DVE) (R$^2$ in Formula (4) is ethanediyl and m is 2), triethylene glycol divinyl ether (R$^2$ in Formula (4) is ethanediyl and m is 3), tetraethylene glycol divinyl ether (R$^2$ in Formula (4) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendant groups selected from alkyl groups, hydroxyl groups, alkoxy groups, and amine groups.

In divinyl ethers of Formula (4) R$^2$ can be C$_{3-6}$ branched alkanediyl may be prepared by reacting a polyhydroxy compound with acetylene. Examples of divinyl ethers of this type include compounds in which R$^2$ in Formula (4) is an alkyl-substituted methanediyl group such as —CH(CH$_3$)— (for example Pluriol® blends such as Pluriol®E-200 divinyl ether (BASF Corp., Parsippany, N.J.), for which R$^2$ in Formula (4) is ethanediyl and m is 3.8) or an alkyl-substituted ethanediyl (for example —CH$_2$CH(CH$_3$)— such as DPE polymeric blends including DPE-2 and DPE-3; International Specialty Products, Wayne, N.J.).

Other useful divinyl ethers include divinyl ethers in which R$^2$ in Formula (4) is polytetrahydrofuryl (poly-THF) or polyoxyalkanediyl, such as those having an average of 3 monomer units.

Two or more types of divinyl ether monomers of Formula (4) may be used. Thus, two dithiols of Formula (3) and one divinyl ether monomer of Formula (4), one dithiol of Formula (3) and two divinyl ether monomers of Formula (4), two dithiols of Formula (3) and two divinyl ether monomers of Formula (4), and more than two dithiols of Formula (3) and two divinyl ethers of Formula (4), may be used to produce a variety of thiol-terminated polythioether prepolymers.

A polyvinyl ether monomer can comprise from 20 mole percent to less than 50 mole percent of the reactants used to prepare a thiol-terminated polythioether prepolymer, or from 30 mole percent to less than 50 mole percent.

The relative amounts of dithiols and divinyl ethers can be selected to yield polythioether prepolymers having terminal thiol groups. Thus, a dithiol of Formula (3) or a mixture of at least two different dithiols of Formula (3), can be reacted with of a divinyl ether of Formula (4) or a mixture of at least two different divinyl ethers of Formula (4) in relative amounts such that the molar ratio of thiol groups to vinyl groups is greater than 1:1, such as 1.1 to 2.0:1.0.

The reaction between dithiols and divinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be a free-radical catalyst, an ionic catalyst, or ultraviolet radiation. A catalyst may not comprise acidic or basic compounds, and does not produce acidic or basic compounds upon decomposition. Examples of suitable free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other free-radical catalysts include alkyl peroxides, such as tert-butyl peroxide. The reaction may also be effected by irradiation with ultraviolet light either with or without a cationic photoinitiating moiety.

Thiol-terminated polythioether prepolymers provided by the present disclosure may be prepared by combining at least one dithiol of Formula (3) and at least one divinyl ether of Formula (4) followed by addition of an appropriate catalyst, and carrying out the reaction at a temperature from 30° C. to 120° C., such as 70° C. to 90° C., for a time from 2 hours to 24 hours, such as 2 hours to 6 hours.

Thiol-terminated polythioethers may comprise a polyfunctional polythioether, i.e., may have an average functionality of greater than 2.0. Suitable polyfunctional thiol-terminated polythioether prepolymers include, for example, those having the structure of Formula (5):

B(-A-SH)$_z$          (5)

where (i) A comprises, for example, a structure of Formula (1), (ii) B denotes a z-valent residue of a polyfunctionalizing agent; and (iii) z can have an average value of greater than 2.0, a value between 2 and 3, a value between 2 and 4, a value between 3 and 6, or can be an integer from 3 to 6.

Polyfunctionalizing agents suitable for use in preparing such polyfunctional thiol-terminated prepolymers include trifunctionalizing agents where z is 3. Suitable trifunctionalizing agents include, for example, triallyl cyanurate (TAC), 1,2,3-propanetrithiol, isocyanurate-containing trithiols, and combinations thereof, as disclosed in U.S. Application Publication No. 2010/0010133. Other useful polyfunctionalizing agents include trimethylolpropane trivinyl ether, and the polythiols described in U.S. Pat. Nos. 4,366,307; 4,609,762; and 5,225,472. Mixtures of polyfunctionalizing agents may also be used.

As a result, thiol-terminated polythioether prepolymers provided by the present disclosure can be characterized by a wide range of average functionality. For example, a combination of difunctional prepolymers and trifunctionalizing prepolymers may afford average functionalities from 2.05 to 3.0, such as from 2.1 to 2.6. Wider ranges of average functionality may be achieved by using tetrafunctional or higher functionality polyfunctionalizing agents. Functionality may also be influenced by factors such as stoichiometry.

Thiol-terminated polythioether prepolymers having a functionality greater than 2.0 may be prepared in a manner similar to the difunctional thiol-terminated polythioether prepolymers described in U.S. Application Publication No. 2010/0010133. For example, thiol-terminated polythioether prepolymers may be prepared by combining (i) one or more dithiols described herein, with (ii) one or more divinyl ethers described herein, and (iii) one or more polyfunctionalizing agents. The mixture may then be reacted, optionally in the presence of a suitable catalyst, to afford a thiol-terminated polythioether prepolymer having a functionality greater than 2.0.

Thus, a thiol-terminated polythioether prepolymer provided by the present disclosure comprises the reaction product of reactants comprising:

(a) a dithiol of Formula (3):

$$HS-R^1-SH \quad (3)$$

wherein:
R$^1$ is selected from C$_{2-6}$ alkanediyl, C$_{6-8}$ cycloalkanediyl, C$_{6-10}$ alkanecycloalkanediyl, C$_{5-8}$ heterocycloalkanediyl, and —[—(CHR$^3$)$_p$—X—]$_q$—(CHR$^3$)$_r$—; wherein:
each R$^3$ is independently selected from hydrogen and methyl;
each X is independently selected from —O—, —S—, —NH—, and —NR— wherein R is selected from hydrogen and methyl;
p is an integer from 2 to 6;
q is an integer from 1 to 5; and
r is an integer from 2 to 10; and (b) a divinyl ether of Formula (4):

$$CH_2=CH-O-[-R^2-O-]_m-CH=CH_2 \quad (4)$$

wherein:
each R$^2$ is independently selected from C$_{1-10}$ alkanediyl, C$_{6-8}$ cycloalkanediyl, C$_{6-14}$ alkanecycloalkanediyl, and —[(—CHR$^3$—)$_p$—X—]$_q$—(—CHR$^3$—)$_r$—, wherein p, q, r, R$^3$, and X are as defined above;
m is an integer from 0 to 50;
n is an integer from 1 to 60; and
p is an integer from 2 to 6.

The reactants can comprise (c) a polyfunctional compound such as a polyfunctional compound B(—V)$_z$, where B, —V, and z are as defined herein.

Thiol-terminated polythioether prepolymers provided by the present disclosure represent thiol-terminated polythioether prepolymers having a molecular weight distribution. For example, useful thiol-terminated polythioether prepolymers can be characterized by a number average molecular weight ranging from 500 Daltons to 20,000 Daltons, from 2,000 Daltons to 5,000 Daltons, or from 3,000 Daltons to 4,000 Daltons. Useful thiol-terminated polythioether prepolymers can exhibit a polydispersity (M$_w$/M$_n$; weight average molecular weight/number average molecular weight) ranging, for example, from 1 to 20, or from 1 to 5. The molecular weight distribution of thiol-terminated polythioether prepolymers may be characterized by gel permeation chromatography.

Curing agents useful in compositions provided by the present disclosure include those that are reactive with the unblocked thiol terminal groups of the sulfur-containing prepolymer.

A curing agent can comprise a polyepoxide curing agent, e.g., an epoxide having two or more reactive epoxy groups. Examples of suitable polyepoxides include, for example, polyepoxide resins such as hydantoin diepoxide, diglycidyl ether of bisphenol-A, diglycidyl ether of bisphenol-F, novolac type epoxies such as DEN® 438 (available from Dow Chemical), epoxidized unsaturated resins, and combinations of any of the foregoing.

A polyepoxide can comprise a diepoxide and a diepoxide can be selected from Epon® 828, DEN® 431, and a combination thereof. Epon® Resin 828, available from Momentive is described as a difunctional bisphenol A/epichlorohydrin derived liquid epoxy resin. DEN® 431, available from Dow Chemical, is described as an epoxy novolac resin comprising the reaction product of epichlorohydrin and phenol-formaldehyde novolac.

A polyepoxide curing agent can comprise an epoxy-functional prepolymer. Examples of suitable epoxy-functional prepolymers include the epoxy-functional polyformal polymers disclosed in U.S. Pat. No. 8,541,513 and epoxy-functional polythioether prepolymers disclosed in U.S. Pat. No. 7,671,145. In general, when used as a curing agent, an epoxy-functional prepolymer can have a molecular weight less than 2,000 Daltons, less than 1,500, Daltons, less than 1,000 Daltons, or less than 500 Daltons.

A polyepoxide can comprise a polyfunctional sulfur-containing epoxide such as disclosed in U.S. Pat. No. 8,710,159, which is incorporated by reference in its entirety.

In such compositions, a polyepoxide may comprise 0.5 wt % to 20 wt % of the composition, from 1 wt % to 10 wt %, from 2 wt % to 8 wt %, from 2 wt % to 6 wt %, or from 3 wt % to 5 wt %, where wt % is based on the total solids weight of the composition.

A blocked 1,8-diazabicyclo[5.4.0]undec-7-ene bicarbonate catalyst provided by the present disclosure comprises the stable bicarbonate salt of DBU. The blocked DBU bicarbonate catalyst can be prepared by reacting DBU with CO$_2$ in the presence of water. For example, the DBU bicarbonate salt can be prepared by reacting DBU with CO$_2$ in a solution containing water and ethyl acetate. The CO$_2$ can be provided as a bubbled gas and/or by added dry ice to the solution. The solution can contain, for example, for 1 wt % water to 3 wt % water, or from 1.5 wt % to 2.5 wt % water. The DBU bicarbonate salt can be ground to a fine powder characterized, for example, by an average particle diameter from 25 µm to 200 µm or from 25 µm to 100 µm. The DBU bicarbonate salt can be characterized by an average particle diameter less than 200 µm, less than 100 µm, or less than 50 µm. A reaction of DBU with carbon dioxide is also described, for example, in Heldebrant et al., *J. Org. Chem.*, 2005, 70(13), pp. 5335-5338.

A blocked DBU bicarbonate catalyst provided by the present disclosure can be activated or unblocked by exposure to temperature. The blocked DBU bicarbonate catalyst can unblock to provide an unblocked, reactive DBU bicarbonate catalyst at room temperature. Exposure of the blocked DBU bicarbonate catalyst to elevated temperatures such as a temperature greater than 100° F., greater than 125° F., or greater than 150° F. for 15 minutes can accelerate the process. At room temperature or higher temperatures an unblocked DBU catalyst can accelerate the reaction between thiol and epoxy groups, reducing both the working time and the curing time of the sealant. However, even when exposed to temperatures above 100° F., a sealant comprising a blocked DBU bicarbonate catalyst provided by the present disclosure will not cure as rapidly as a similar sealant composition comprising an unblocked DBU bicarbonate catalyst.

The blocked DBU bicarbonate catalyst can be activated by heating the sealant composition before applying the curable sealant composition to a part, after applying the curable sealant composition a part, or both before and after applying the curable sealant composition to a part. The temperature and the time during which the sealant is exposed to an elevated temperature can be selected to unblock the blocked DBU bicarbonate to provide a desired working time and cure time.

Compositions provided by the present disclosure include curable compositions and cured compositions. A curable composition comprises a mixture of reactants that have not reacted or have partially reacted and where the viscosity of the curable composition is such that the curable composition can still be applied to a part for its intended purpose. The viscosity at which the composition is no longer workable depends in part on the method of application such as whether the composition is applied, for example, by brushing, spraying, roller coating, pressing, or extrusion. A cured composition can refer to a composition in which the components have reacted to an extent as to provide a tack-free surface and to provide a Shore A hardness of at least 30 A.

Curable compositions provided by the present disclosure can comprise from 25 wt % to 75 wt % of a thiol-terminated sulfur-containing prepolymer; from 2 wt % to 20 wt % of a polyepoxide curing agent; and from 0.1 wt % to 1 wt % of a blocked 1,8-diazabicyclo[5.4.0]undec-7-ene bicarbonate catalyst.

Curable compositions provided by the present disclosure can comprise from 35 wt % to 65 wt % of a thiol-terminated sulfur-containing prepolymer; from 4 wt % to 11 wt % of a polyepoxide curing agent; and from 0.2 wt % to 0.36 wt % of a blocked 1,8-diazabicyclo[5.4.0]undec-7-ene bicarbonate catalyst.

Compositions provided by the present disclosure may also include an unblocked basic catalyst, such as an amine catalyst, in addition to the blocked DBU bicarbonate. In such compositions, the blocked DBU catalyst may be the primary catalyst and the amine catalyst may be a secondary catalyst, where the composition comprises a greater amount of the blocked DBU catalyst than the amount of amine catalyst.

Examples of suitable amine catalysts include triethylenediamine (1,4-diazabicyclo[2.2.2]octane, DABCO), dimethylcyclohexylamine (DMCHA), dimethylethanolamine (DMEA), bis-(2-dimethylaminoethyl)ether, N-ethylmorpholine, triethylamine, 1,8-diazabicyclo[5.4.0]undecene-7 (DBU), pentamethyldiethylenetriamine (PMDETA), benzyldimethylamine (BDMA), N,N,N'-trimethyl-N'-hydroxyethyl-bis(aminoethyl)ether, and N'-(3-(dimethylamino)propyl)-N,N-dimethyl-1,3-propanediamine.

Sealants provided by the present disclosure can be suitable for as Grade A, Grade B, or Grade C aerospace sealants. A Grade A sealant is typically applied by brushing and has a viscosity from 150 Poise to 500 Poise. A Grade B sealant can be applied by extrusion such as by extrusion using a pneumatic Semco® gun and can be characterized by a high viscosity from 8,000 Poise to 16,000 Poise. A Grade B sealant can be used for forming fillets and sealing on vertical surfaces where low slump/sag is desired. A Grade C sealant can be applied using a roller coating or a combed tooth spreader and has a medium viscosity from 1,000 Poise to 4,000 Poise. A Grade C sealant can be used for sealing fay surfaces.

For aerospace sealant applications it can be desirable that a sealant meet the requirements of Mil-S-22473E (Sealant Grade C) at a cured thickness of 20 mils, exhibit an elongation greater than 200%, a tensile strength greater than 250 psi, and excellent fuel resistance, and maintain these properties over a wide temperature range from −67° F. to 360° F. In general, the visual appearance of the sealant is not an important attribute. Prior to full cure, a sealant provided by the present disclosure can have a working time of at least 12 hours, at least 16 hours, or at least 20 hours at room temperature. After the sealant is partially cured and is no longer workable sealants provided by the present disclosure can have a tack-free cure time of less than 4 hours, less than 8 hours, less than 12 hours, or less than 24 hours. Working time refers to the time period the sealant remains workable or spreadable for application at ambient temperatures after the composition has been heated to activate the blocked DBU catalyst. For example, a numerical scale can be used to assess the working time where (1) represents the workability of the initially activated sealant; (2) represents a sealant having a viscosity slightly greater than the initially activated sealant; (3) represents a sealant having a significantly greater viscosity than that of the initially activated sealant; (4) represents a sealant that has begun to gel but remains spreadable; (5) represents a sealant that has gelled but is no longer spreadable; (6) represents a sealant that has almost cured, but is not tack-free; (7) represents a sealant that is cured to a tack-free condition; (8) represents a cured sealant having Shore A hardness of 20 A; (9) represents a cured sealant having Shore A hardness of 35 A; and (10) represents a cured sealant having Shore A hardness of 45 A.

Compositions can comprise a thiol-terminated sulfur-containing polymer, a polyepoxide curing agent, and a blocked DBU bicarbonate catalyst, and after exposing the composition to a temperature of at least 200° F. for 15 minutes, can exhibit a working time of at least 10 hours, and a cure time of less than 10 hours ambient temperature and humidity.

Compositions provided by the present disclosure may comprise one or more additional components suitable for use in aerospace sealants and depend at least in part on the desired performance characteristics of the cured sealant under conditions of use.

Compositions provided by the present disclosure can comprise one or more than one adhesion promoters. A one or more additional adhesion promoter may be present in amount from 0.1 wt % to 15 wt % of a composition, less than 5 wt %, less than 2 wt %, or less than 1 wt %, based on the total dry weight of the composition. Examples of adhesion promoters include phenolics, such as Methylon® phenolic resin, and organosilanes, such as epoxy, mercapto or amino functional silanes, such as Silquest® A-187 and Silquest® A-1100. An adhesion promoter can also comprise T-1601, available from PRC-DeSoto International, Inc.

Suitable adhesion promoters include sulfur-containing adhesion promoters such as those disclosed in U.S. Pat. No. 8,513,339, which is incorporated by reference in its entirety.

Compositions provided by the present disclosure may comprise one or more different types of filler. Suitable fillers include those commonly known in the art, including inorganic fillers, such as carbon black and calcium carbonate (CaCO$_3$), silica, polymer powders, and lightweight fillers. Suitable lightweight fillers include, for example, those described in U.S. Pat. No. 6,525,168. A composition can include 5 wt % to 60 wt % of the filler or combination of fillers, 10 wt % to 50 wt %, or from 20 wt % to 40 wt %, based on the total dry weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

Compositions provided by the present disclosure can include low density filler particles. As used herein, low density, when used with reference to such particles means that the particles have a specific gravity of no more than 0.7, or no more than 0.25, and or no more than 0.1. Suitable lightweight filler particles often fall within two categories; microspheres and amorphous particles. The specific gravity of microspheres may range from 0.1 to 0.7 and include, for example, polystyrene foam, microspheres of polyacrylates and polyolefins, and silica microspheres having particle sizes ranging from 5 microns to 100 microns and a specific gravity of 0.25 (Eccospheres®). Other examples include alumina/silica microspheres having particle sizes in the range of 5 to 300 microns and a specific gravity of 0.7 (Fillite®), aluminum silicate microspheres having a specific gravity of from 0.45 to 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of 40 μm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). Compositions provided by the present disclosure can include lightweight filler particles comprising an exterior surface coated with a thin coating, such as those described in U.S. Application Publication No. 2010/0041839 at paragraphs [0016]-[0052], the cited portion of which is incorporated by reference.

A low density filler can comprise less than 5 wt % less than 2 wt % of a composition, less than 1.5 wt %, less than 1.0 wt %, less than 0.8 wt %, less than 0.75 wt %, less than 0.7 wt %, or less than 0.5 wt % of a composition, where wt % is based on the total dry solids weight of the composition.

Compositions provided by the present disclosure can comprise at least one filler that is effective in reducing the specific gravity of the composition. The specific gravity of a composition can be from 0.8 to 1, 0.7 to 0.9, from 0.75 to 0.85, or 0.8. The specific gravity of a composition can be less than 0.9, less than 0.8, less than 0.75, less than 0.7, less than 0.65, less than 0.6, or less than 0.55.

Compositions provided by the present disclosure comprise an electrically conductive filler. Electrical conductivity and EMI/RFI shielding effectiveness can be imparted to a composition by incorporating conductive materials within the polymer. The conductive elements can include, for example, metal or metal-plated particles, fabrics, meshes, fibers, and combinations thereof. The metal can be in the form of, for example, filaments, particles, flakes, or spheres. Examples of metals include copper, nickel, silver, aluminum, tin, and steel. Other conductive materials that can be used to impart EMI/RFI shielding effectiveness to polymer compositions include conductive particles or fibers comprising carbon or graphite. Conductive polymers such as polythiophenes, polypyrroles, polyaniline, poly(p-phenylene) vinylene, polyphenylene sulfide, polyphenylene, and polyacetylene can also be used.

Examples of electrically non-conductive fillers include materials such as, but not limited to, calcium carbonate, mica, polyamide, fumed silica, molecular sieve powder, microspheres, titanium dioxide, chalks, alkaline blacks, cellulose, zinc sulfide, heavy spar, alkaline earth oxides, alkaline earth hydroxides, and the like. Fillers also include high band gap materials such as zinc sulfide and inorganic barium compounds. An electrically conductive base composition can comprise an amount of electrically non-conductive filler ranging from 2 wt % to 10 wt % based on the total weight of the base composition, or can range from 3 wt % to 7 wt %. A curing agent composition can comprise an amount of electrically non-conductive filler ranging from less than 6 wt % or ranging from 0.5% to 4% by weight, based on the total weight of the curing agent composition.

Fillers used to impart electrical conductivity and EMI/RFI shielding effectiveness to polymer compositions are well known in the art. Examples of electrically conductive fillers include electrically conductive noble metal-based fillers such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive fillers. Non-noble metal-based materials can also be used and include, for example, non-noble metal-plated non-noble metals such as copper-coated iron particles or nickel plated copper; non-noble metals, e.g., copper, aluminum, nickel, cobalt; non-noble-metal-plated-non-metals, e.g., nickel-plated graphite and non-metal materials such as carbon black and graphite. Combinations of electrically conductive fillers can also be used to meet the desired conductivity, EMI/RFI shielding effectiveness, hardness, and other properties suitable for a particular application.

The shape and size of the electrically conductive fillers used in compositions of the present disclosure can be any appropriate shape and size to impart EMI/RFI shielding effectiveness to the cured composition. For example, fillers can be of any shape that is generally used in the manufacture of electrically conductive fillers, including spherical, flake, platelet, particle, powder, irregular, fiber, and the like. In certain sealant compositions of the disclosure, a base composition can comprise Ni-coated graphite as a particle, powder or flake. The amount of Ni-coated graphite in a base composition can range from 40 wt % to 80 wt %, or from 50 wt % to 70 wt %, based on the total weight of the base composition. An electrically conductive filler can comprise Ni fiber. Ni fiber can have a diameter ranging from 10 μm to 50 μm and have a length ranging from 250 μm to 750 μm. A base composition can comprise, for example, an amount of Ni fiber ranging from 2 wt % to 10 wt %, or from 4 wt % to 8 wt %, based on the total weight of the base composition.

Carbon fibers, particularly graphitized carbon fibers, can also be used to impart electrical conductivity to compositions of the present disclosure. Carbon fibers formed by vapor phase pyrolysis methods and graphitized by heat treatment and which are hollow or solid with a fiber diameter ranging from 0.1 micron to several microns, have high electrical conductivity. As disclosed in U.S. Pat. No. 6,184,280, carbon microfibers, nanotubes or carbon fibrils having an outer diameter of less than 0.1 μm to tens of nanometers can be used as electrically conductive fillers. An example of graphitized carbon fiber suitable for conductive compositions of the present disclosure include Panex® 3OMF (Zoltek Companies, Inc., St. Louis, Mo.), a 0.921 μm diameter round fiber having an electrical resistivity of 0.00055 Ω-cm.

The average particle size of an electrically conductive filler can be within a range useful for imparting electrical conductivity to a polymer-based composition. For example, the particle size of the one or more fillers can range from 0.25 μm to 250 μm, can range from 0.25 μm to 75 μm, or can range from 0.25 μm to 60 μm. A composition of the present disclosure can comprise Ketjenblack® EC-600 JD (Akzo Nobel, Inc., Chicago, Ill.), an electrically conductive carbon black characterized by an iodine absorption of 1000-11500 mg/g (J0/84-5 test method), and a pore volume of 480-510 cm$^3$/100 g (DBP absorption, KTM 81-3504). An electrically conductive carbon black filler can be Black Pearls 2000 (Cabot Corporation, Boston, Mass.).

Electrically conductive polymers can be used to impart or modify the electrical conductivity of compositions of the present disclosure. Polymers having sulfur atoms incorporated into aromatic groups or adjacent to double bonds, such as in polyphenylene sulfide, and polythiophene, are known to be electrically conductive. Other electrically conductive polymers include, for example, polypyrroles, polyaniline, poly(p-phenylene) vinylene, and polyacetylene. A sulfur-containing polymers forming a base composition can comprise polysulfides and/or polythioethers. As such, the sulfur-containing polymers can comprise aromatic sulfur groups and sulfur atoms adjacent to conjugated double bonds such as vinylcyclohexene-dimercaptodioxaoctane groups, to enhance the electrical conductivity of the compositions of the present disclosure.

Compositions of the present disclosure can comprise more than one electrically conductive filler and the more than one electrically conductive filler can be of the same or different materials and/or shapes. For example, a sealant composition can comprise electrically conductive Ni fibers, and electrically conductive Ni-coated graphite in the form of powder, particles or flakes. The amount and type of electrically conductive filler can be selected to produce a sealant composition which, when cured, exhibits a sheet resistance (four-point resistance) of less than 0.50 Ω/cm$^2$, or a sheet resistance less than 0.15 Ω/cm$^2$. The amount and type of filler can also be selected to provide effective EMI/RFI shielding over a frequency range of from 1 MHz to 18 GHz for an aperture sealed using a sealant composition of the present disclosure.

Galvanic corrosion of dissimilar metal surfaces and the conductive compositions of the present disclosure can be minimized or prevented by adding corrosion inhibitors to the composition, and/or by selecting appropriate conductive fillers. Corrosion inhibitors can include strontium chromate, calcium chromate, magnesium chromate, and combinations thereof. U.S. Pat. No. 5,284,888 and U.S. Pat. No. 5,270,364 disclose the use of aromatic triazoles to inhibit corrosion of aluminum and steel surfaces. A sacrificial oxygen scavenger such as Zn can be used as a corrosion inhibitor. A corrosion inhibitor can comprise less than 10% by weight of the total weight of the electrically conductive composition. A corrosion inhibitor can comprise an amount ranging from 2% by weight to 8% by weight of the total weight of the electrically conductive composition. Corrosion between dissimilar metal surfaces can also be minimized or prevented by the selection of the type, amount, and properties of the conductive fillers comprising the composition.

A sulfur-containing polymer comprises from 50 wt % to 90 wt % of a composition, from 60 wt % to 90 wt %, from 70 wt % to 90 wt %, or from 80 wt % to 90 wt % of the composition, where wt % is based on the total dry solids weight of the composition.

A composition may also include any number of additives as desired. Examples of suitable additives include plasticizers, pigments, surfactants, adhesion promoters, thixotropic agents, fire retardants, masking agents, and accelerators (such as amines, including 1,4-diaza-bicyclo[2.2.2]octane, DABCO®), and combinations of any of the foregoing. When used, the additives may be present in a composition in an amount ranging, for example, from 0 wt % to 60 wt %, where wt % is based on the total solids weight of the composition. Additives may be present in a composition in an amount ranging from 25 wt % to 60 wt % based on the total solids weight of the composition.

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A sealant can be used as a fuel tank sealant. A coating composition includes a covering that is applied to the surface of a substrate to, for example, improve the properties of the substrate such as the appearance, adhesion, wettability, corrosion resistance, wear resistance, fuel resistance, and/or abrasion resistance. A potting composition includes a material useful in an electronic assembly to provide resistance to shock and vibration and to exclude moisture and corrosive agents. Sealants provided by the present disclosure are useful, e.g., as aerospace sealants and as linings for fuel tanks.

Compositions, such as sealants, may be provided as multi-pack compositions, such as two-pack compositions, wherein one package comprises one or more polythioether prepolymers and a blocked DBU bicarbonate catalyst provided by the present disclosure and a second package comprises one or more polyepoxide curing agents. Additives and/or other materials may be added to either package as desired or necessary. The two packages may be combined and mixed prior to use. The working time of a sealant provided by the present disclosure, without exposure to elevated temperature, can be at least 15 hours, at least 20 hours, or at least 30 hours; and the tack-free cure time can be less than 30 hours, less than 40, hours or less than 50 hours.

A composition can cure to a tack-free surface within 24 hours to 72 hours after the working time at a temperature of 25° C. (room temperature) or higher. The time to form a viable seal using a sealant composition provided by the present disclosure can depend on several factors as can be appreciated by those skilled in the art, and as defined by the requirements of applicable standards and specification. In general, a curable sealant composition provided by the present disclosure develops a tack-free cure within 1 to 2 days after application to a surface. In general, a sealant becomes fully cured to a Shore A hardness of 45 A within 7 days following mixing and application of the curable sealant composition to a surface.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. Compositions provided by the present disclosure may be applied to a coating on a substrate, such as a polyurethane coating.

Compositions provided by the present disclosure may be applied directly onto the surface of a substrate or over an underlayer by any suitable coating process known to those of ordinary skill in the art.

Furthermore, methods are provided for sealing utilizing part using a sealant composition provided by the present disclosure. These methods comprise, for example, applying a sealant composition provided by the present disclosure to a part, and curing the applied composition. Curing the applied sealant composition can comprise allowing the sealant to cure at ambient temperature and humidity or can comprise exposing the sealant to elevated temperature either for a short period of time or for an extended period of time. As will also be appreciated, the methods may be used to seal apertures on aerospace vehicles including aircraft and aerospace vehicles.

A composition may be cured under ambient conditions, where ambient conditions refers to a temperature from 20° C. to 25° C., and atmospheric humidity. A composition may be cured under conditions encompassing a temperature from a 0° C. to 100° C. and humidity from 0% relative humidity to 100% relative humidity. A composition may be cured at a higher temperature such as at least 30° C., at least 40° C., or at least 50° C. A composition may be cured at room temperature, e.g., 25° C.

Cured compositions disclosed herein, such as cured sealants, exhibit properties acceptable for use in aerospace applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in Jet Reference Fluid (JRF) Type I for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, the entirety of which is incorporated by reference. It is also desirable that, when cured, compositions of the present disclosure used in aviation and aircraft applications exhibit a percent volume swell not greater than 25% following immersion for one week at 60° C. (140° F.) and ambient pressure in JRF Type I. Other properties, ranges, and/or thresholds may be appropriate for other sealant applications.

Compositions provided by the present disclosure can be fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in JRF Type I according to methods similar to those described in ASTM D792 (American Society for Testing and Materials) or AMS 3269 (Aerospace Material Specification). JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, § 3.1.1 etc., available from SAE (Society of Automotive Engineers)).

Compositions provided herein provide a cured product, such as a sealant, exhibiting a tensile elongation of at least 100% and a tensile strength of at least 400 psi when measured in accordance with the procedure described in AMS 3279, § 3.3.17.1, test procedure AS5127/1, § 7.7.

Compositions can provide a cured product, such as a sealant, that exhibits a lap shear strength of greater than 200 psi, such as at least 220 psi, at least 250 psi, and, in some cases, at least 400 psi, when measured according to the procedure described in SAE AS5127/1 paragraph 7.8.

A cured sealant comprising a composition provided by the present disclosure can meet or exceed the requirements for aerospace sealants as set forth in AMS 3277.

Parts and surfaces, including parts and surfaces of aerospace vehicles, sealed with sealants provided by the present disclosure are also disclosed.

An electrically conductive sealant composition provided by the present disclosure can exhibit the following properties measured at room temperature following exposure at 500° F. for 24 hours: a surface resistivity of less than 1 ohms/square, a tensile strength greater than 200 psi, an elongation greater than 100%, and a cohesive failure of 100% measured according to MIL-C-27725.

A cured sealant provided by the present disclosure exhibits the following properties when cured for 2 days at room temperature, 1 day at 140° F., and 1 day at 200° F.: a dry hardness of 49, a tensile strength of 428 psi, and an elongation of 266%; and after 7 days in JRF Type I, a hardness of 36, a tensile strength of 312 psi, and an elongation of 247%.

Compositions provided by the present disclosure can exhibit a Shore A hardness greater than 10, greater than 20, greater than 30, or greater than 40; a tensile strength greater than 10 psi, greater than 100 psi, greater than 200 psi, or greater than 500 psi; an elongation greater than 100%, greater than 200%, greater than 500%, or greater than 1,000%; and a swell following exposure to JRF Type 1 (7 days) less than 20%.

EXAMPLES

Blocked DBU bicarbonate catalysts and compositions provided by the present disclosure are further illustrated by reference to the following examples, which describe the synthesis, properties, and uses of certain blocked DBU catalysts, compositions, and sealants. It will be apparent to those skilled in the art that many modifications, both to materials, and methods, may be practiced without departing from the scope of the disclosure.

Example 1

Synthesis of DBU Bicarbonate Catalyst

Into a 2,000-mL, 4-necked kettle equipped with a stirrer, a condenser, a nitrogen inlet, and a thermocouple, 50.6 g of DBU (Industrial grade from BASF), 6.66 g of distilled water, 300 g of ethyl acetate were combined. Fifty (50) g of dry ice was partially added into the reaction mixture and a white precipitate formed. After the dry ice was completely added, the reaction mixture was held at room temperature for 1 h. The white solid was collected by filtration. The solid was then washed twice with ethyl acetate (3×50 mL) and dried in a vacuum oven. A white powder was obtained in a yield of 97% by weight. One (1) wt % fumed silica was added to the white solid and mixed. The mixed solid was ground into a fine powder (75 m) by using an Air Classifier Mill (ACM) manufactured by MIKRO.

Comparative Example 1

Comparative Sealant Formulation

A comparative sealant formulation consisted of two parts, a base and an accelerator. The base formulation is shown in Table 1 and the accelerator formulation is shown in Table 2.

TABLE 1

Base Formulation of Comparative Example 1.

| Component | Weight, g |
|---|---|
| Adhesion Promoter* | 0.97 |
| Silica | 1.46 |
| Calcium carbonate | 53.5 |
| Aluminum hydroxide | 9.73 |
| Tetra N-butyl titanate | 0.49 |
| Titanium dioxide | 0.97 |
| Phenolic resin | 1.46 |
| Polythioether prepolymer** | 107 |
| Silane | 0.2 |
| Tung oil | 1.41 |
| DABCO ® 33-LV | 1.05 |

*Adhesion promoter, available from PRC-DeSoto International, Inc.
**Thiol-terminated polythioether prepolymer, available from PRC-DeSoto International, Inc.

The components of the base formulation in Table 1 were thoroughly mixed and the base formulation was kept at room temperature for 24 hours before mixing with the accelerator.

TABLE 2

Accelerator Formulation of Comparative Example 1.

| Composition | Weight, g |
|---|---|
| Adhesion Promoter* | 5.7 |
| Calcium carbonate | 50.4 |
| Plasticizer | 40 |
| Carbon black | 24 |
| Epoxy Resin, DEN ® 431 | 50 |
| Epoxy Resin, Epon ® 828 | 50 |

*Adhesion promoter T-1601, available from PRC-DeSoto International, Inc.

The accelerator components were thoroughly mixed and the accelerator formulation was kept at room temperature for 24 hours before mixing with the base.

A sealant was prepared by mixing 100 g of the base with 18.5 g of the accelerator and maintained at room temperature. The curing status of the sealant, expressed as a numerical scale, was recorded periodically. The results are shown in FIG. 1. The numerical scale is classified as shown in Table 3.

TABLE 3

Curing Status Classification.

| Scale | Curing Status |
|---|---|
| 1 | Freshly mixed sealant |
| 2 | Slightly more viscous than the freshly mixed sealant |
| 3 | Noticeably more viscous than the freshly mixed sealant |
| 4 | Slight gelling, but the sealant is movable and spreadable |
| 5 | Gelled and not spreadable |
| 6 | Slightly more gelled |
| 7 | Almost cured, but not tack-free |
| 8 | Tack-free |
| 9 | Shore A hardness 20A |
| 10 | Shore A hardness 35A |
| 11 | Shore A hardness 45A |

Example 2

Sealant Formulation

An inventive sealant formulation consisted of two parts, a base and an accelerator. The base formulation is shown in Table 4 and the accelerator formulation is shown in Table 5.

TABLE 4

Base Formulation of Example 2.

| Composition | Weight, g |
|---|---|
| Adhesion Promoter* | 0.97 |
| Silica | 1.46 |
| Calcium carbonate | 53.5 |
| Aluminum hydroxide | 9.73 |
| Tetra N-butyl titanate | 0.49 |
| Titanium dioxide | 0.97 |
| Phenolic resin | 1.46 |
| Polythioether prepolymer** | 107 |
| Silane | 0.2 |
| Tung oil | 1.41 |
| Ethyl acetate | 10.63 |
| DBU bicarbonate salt (Example 1) | 0.63 |

*Adhesion promoter, available from PRC-DeSoto International, Inc.
**Thiol-terminated polythioether prepolymer, available from PRC-DeSoto International, Inc.

The base components were thoroughly mixed and the composition was maintained at room temperature for 24 hours before mixing with the accelerator.

TABLE 5

Accelerator Formulation of Example 2.

| Composition | Weight, g |
|---|---|
| Adhesion Promoter* | 5.7 |
| Calcium carbonate | 50.4 |
| Plasticizer | 40 |
| Carbon black | 24 |
| Epoxy Resin, DEN ® 431 | 50 |
| Epoxy Resin, Epon ® 828 | 50 |

*T-1601 adhesion promoter, available from PRC-DeSoto International, Inc.

The accelerator components were thoroughly mixed and the composition maintained at room temperature for 24 hours before mixing with the base.

A sealant was prepared by mixing 100 g of the base with 18.5 g of the accelerator and then exposing the uncured sealant to the following thermal conditions:
  Condition 1: The sealant was maintained as room temperature without heating.
  Condition 2: The sealant was heated for 140° F. for 15 min and allowed to cool to room temperature.
  Condition 3: The sealant was heated for 170° F. for 15 min and allowed to cool to room temperature.

After exposure to the various thermal conditions, the curing status of each sealant was monitored periodically. The results are presented in FIG. 1. The numerical scale is classified as shown in Table 3.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:
1. A composition comprising:
  (a) a thiol-terminated sulfur-containing prepolymer;
  (b) a polyepoxide curing agent; and
  (c) a blocked 1,8-diazabicyclo[5.4.0]undec-7-ene bicarbonate catalyst.
2. The composition of claim 1, wherein the catalyst is in the form of a powder.

3. A composition comprising:
(a) a thiol-terminated sulfur-containing prepolymer;
(b) a polyepoxide curing agent; and
(c) a blocked 1,8-diazabicyclo[5.4.0]undec-7-ene bicarbonate catalyst, wherein,
the catalyst is in the form of a powder; and
the powder is characterized by an average particle diameter from 25 μm to 200 μm.

4. A composition comprising:
(a) a thiol-terminated sulfur-containing prepolymer;
(b) a polyepoxide curing agent; and
(c) a blocked 1,8-diazabicyclo[5.4.0]undec-7-ene bicarbonate catalyst, wherein,
the catalyst is in the form of a powder; and
the powder is characterized by an average particle diameter less than 100 μm.

5. The composition of claim 1, wherein the polyepoxide curing agent comprises an epoxy novolac resin, a bisphenol A/epichlorohydrin epoxy resin, or a combination thereof.

6. The composition of claim 1, wherein the composition comprises:
from 35 wt % to 65 wt % of the thiol-terminated sulfur-containing prepolymer;
from 4 wt % to 11 wt % of the polyepoxide curing agent; and
from 0.2 wt % to 0.36 wt % of the blocked 1,8-diazabicyclo[5.4.0]undec-7-ene bicarbonate catalyst.

7. The composition of claim 1, wherein the thiol-terminated sulfur-containing prepolymer comprises a thiol-terminated polythioether prepolymer.

8. The composition of claim 7, wherein the thiol-terminated polythioether prepolymer comprises a thiol-terminated polythioether prepolymer of Formula (2), a thiol-terminated polythioether prepolymer of Formula (2a), or a combination thereof:

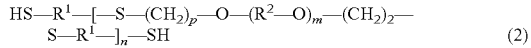

(2)

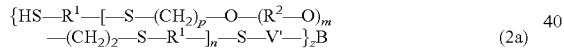

(2a)

wherein:
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(-CHR^3-)_p-X-]_q-(-CHR^3-)_r-$,
wherein:
p is an integer from 2 to 6;
q is an integer from 1 to 5;
r is an integer from 2 to 10;
each $R^3$ is independently selected from hydrogen and methyl; and
each X is independently selected from $-O-$, $-S-$, $-NH-$, and $-N(-CH_3)-$;
each $R^2$ is independently selected from $C_{1-10}$ alkanediyl, $C_{6-8}$ cycloalkanediyl, $C_{6-14}$ alkanecycloalkanediyl, and $-[(-CHR^3-)_p-X-]_q-(-CHR^3-)_r-$, wherein p, q, r, $R^3$, and X are as defined as for $R^1$;
m is an integer from 0 to 50;
n is an integer from 1 to 60;
p is an integer from 2 to 6;
B represents a core of a z-valent, vinyl-terminated polyfunctionalizing agent $B(-V)_z$ wherein:
z is an integer from 3 to 6; and
each V is a group comprising a terminal vinyl group; and each $-V'-$ is derived from the reaction of $-V$ with a thiol.

9. The composition of claim 7, wherein the thiol-terminated polythioether prepolymer comprises the reaction product of reactants comprising:
(a) a dithiol of Formula (3):

(3)

wherein,
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_p-X-]_q-(CHR^3)_r-$;
wherein:
each $R^3$ is independently selected from hydrogen and methyl;
each X is independently selected from $-O-$, $-S-$, $-NH-$, and $-N(-CH_3)-$;
p is an integer from 2 to 6;
q is an integer from 1 to 5; and
r is an integer from 2 to 10; and
(b) a divinyl ether of Formula (4):

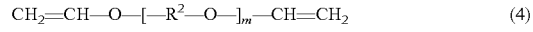

(4)

wherein,
each $R^2$ is independently selected from $C_{1-10}$ alkanediyl, $C_{6-8}$ cycloalkanediyl, $C_{6-14}$ alkanecycloalkanediyl, and $-[(-CHR^3-)_{sp}-X-]_q-(-CHR^3-)_r-$, wherein p, q, r, $R^3$, and X are as defined for $R^1$;
m is an integer from 0 to 50;
n is an integer from 1 to 60; and
p is an integer from 2 to 6.

10. The composition of claim 9, wherein the reactants further comprise (c) a polyfunctional compound $B(-V)$, wherein:
z is an integer from 3 to 6; and
each $-V$ is a moiety comprising a terminal group that is reactive with a thiol group.

11. The composition of claim 1, further comprising an unblocked amine catalyst.

12. The composition of claim 1, formulated as a sealant.

13. A cured sealant prepared from the composition of claim 12.

14. A part comprising the cured sealant of claim 13 on at least a portion of the part.

15. A method of sealing a part, comprising:
applying the composition to at least a portion of a part; and
curing the applied composition to provide a sealed part.

16. The method of claim 15, comprising heating the composition before applying the composition to the part, after applying the composition to the part, or both before and after applying the composition to the part.

17. The composition of claim 1, wherein the thiol-terminated polythioether prepolymer comprises a backbone comprising a structure of Formula (1):

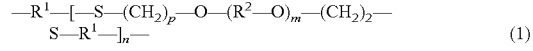

(1)

wherein:
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(-CHR^3-)_p-X-]_q-(-CHR^3-)_r-$,
wherein:

p is an integer from 2 to 6;
q is an integer from 1 to 5;
r is an integer from 2 to 10;
each $R^3$ is independently selected from hydrogen and methyl; and
each X is independently selected from —O—, —S—, —NH—, and —N(—CH$_3$)—;
each $R^2$ is independently selected from $C_{1-10}$ alkanediyl, $C_{6-8}$ cycloalkanediyl, $C_{6-14}$ alkanecycloalkanediyl, and —[(—CHR$^3$—)$_p$—X—]$_q$—(—CHR$^3$—)$_r$—, wherein p, q, r, $R^3$, and X are as defined as for $R^1$;
m is an integer from 0 to 50;
n is an integer from 1 to 60; and
p is an integer from 2 to 6.

18. The method of claim 15, wherein the part comprises a surface of an aerospace vehicle.

19. An aerospace vehicle comprising the composition of claim 1.

20. An aerospace vehicle comprising the cured sealant of claim 13.

\* \* \* \* \*